United States Patent
Anderson

[15] 3,658,277
[45] Apr. 25, 1972

[54] AIRCRAFT ANTI-HIJACKING STRUCTURE

[72] Inventor: Charles I. Anderson, 7399 South Main Street, Downers Grove, Ill. 60515

[22] Filed: Dec. 11, 1970

[21] Appl. No.: 97,070

[52] U.S. Cl. ...................................244/1 R, 49/41, 109/8, 244/119
[51] Int. Cl. ......................B64c 1/00, E05g 3/00, E06b 3/34
[58] Field of Search....................244/1 R, 119, 1 P; 52/106; 109/3, 6, 8; 49/41, 263

[56] References Cited

FOREIGN PATENTS OR APPLICATIONS 883  10/1908  Great Britain..............................109/3

Primary Examiner—Edward A. Sroka
Attorney—Davis, Lucas, Brewer & Brugman

[57] ABSTRACT

Normally inoperative walls in entrance area of aircraft between passenger and pilot areas rendered operable by control in pilot area and automatically actuated in response to downward pressure on floor in entrance area for movement to operative position to trap within the entrance area person or persons stepping on floor thereof. Such movable walls are segments of hollow cylinder rotatable to operative position into edge-overlapping relation with stationary walls comprising segments of coaxial hollow cylinder thereby to block access from entrance area to exterior of aircraft and passenger and pilot areas. Thus enclosed entrance area may be filled with temporarily effective disabling gas and subsequently evacuated thereof, both under control from pilot area.

12 Claims, 10 Drawing Figures

PATENTED APR 25 1972

Inventor:
Charles L. Anderson
By Davis, Lucas, Brewer & Brugman
Attys.

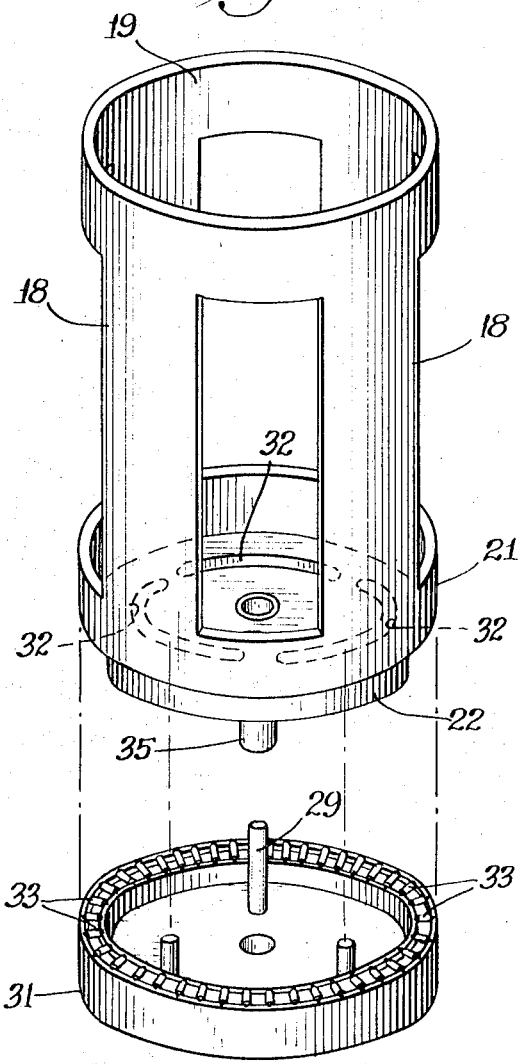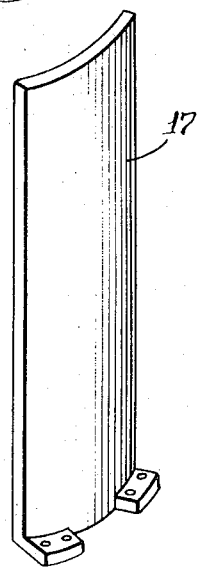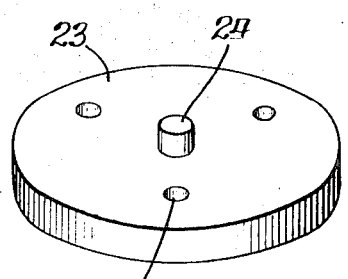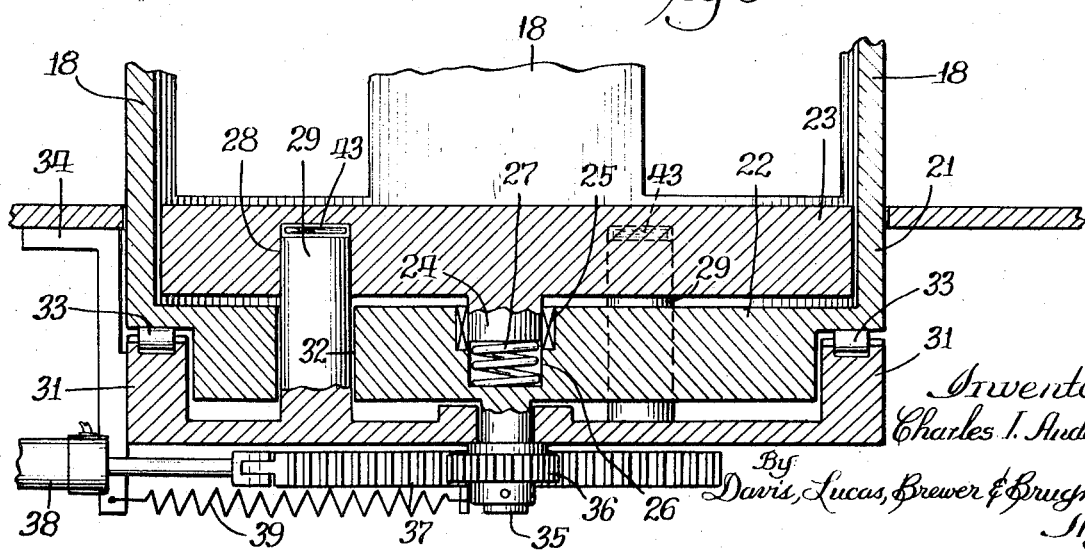

Inventor:
Charles L. Anderson
By: Davis, Lucas, Brewer & Brugman
Attys.

Inventor:
Charles I. Anderson
By Davis, Lucas, Brewer & Brugman
Attys.

3,658,277

AIRCRAFT ANTI-HIJACKING STRUCTURE

BACKGROUND OF THE INVENTION

1. Field of the Invention

This invention relates generally to aircraft, and more particularly to novel means for preventing hijacking thereof.

2. Description of the Prior Art

The problem of combating hijacking of aircraft of late has become peculiarly serious. As is well-known, aircraft hijacking has been accomplished primarily by threat of force against a hostage to gain access to the pilot area or to enforce hijacking demands against the pilot. The prior art appears not to be pertinent to this problem since the only art known relates to protecting banks, and the like, against robbers which comprises structures not adapted to use in aircraft and having characteristics and operating features incapable of accomplishing the end results here contemplated.

SUMMARY OF THE INVENTION

This invention provides a solution to the aircraft hijacking problem by automatically confining a would-be hijacker in the entrance area as he sets foot therein and preventing his exit therefrom. Such is accomplished by providing a wall structure comprising normally inoperative vertical wall means defining the entrance area, floor means in the latter, and actuating means rendered operable by a control in the pilot area for subsequent automatic operation in response to downward pressure on the floor means to move the wall means to operative position to block access from the passenger area to the pilot area and trap within the entrance area that which applied pressure to the floor means. It is further contemplated that the thus enclosed entrance area may be filled with a temporarily effective disabling gas if a hostage is involved and is trapped with the hijacker and subsequently evacuated thereof under control from the pilot area, whereupon the wall means may be returned to inoperative position to enable removal of the person or persons trapped.

In the drawings:

FIG. 3 is a detail vertical section taken substantially on the line 3—3 of FIG. 7;

FIG. 4 is an exploded view in perspective of the movable wall means and its supporting structure;

FIG. 5 is a perspective view of one of the stationary wall members;

FIG. 6 is a perspective view of the floor means, as seen from the bottom thereof;

DESCRIPTION OF THE PREFERRED EMBODIMENTS

Figure 1:
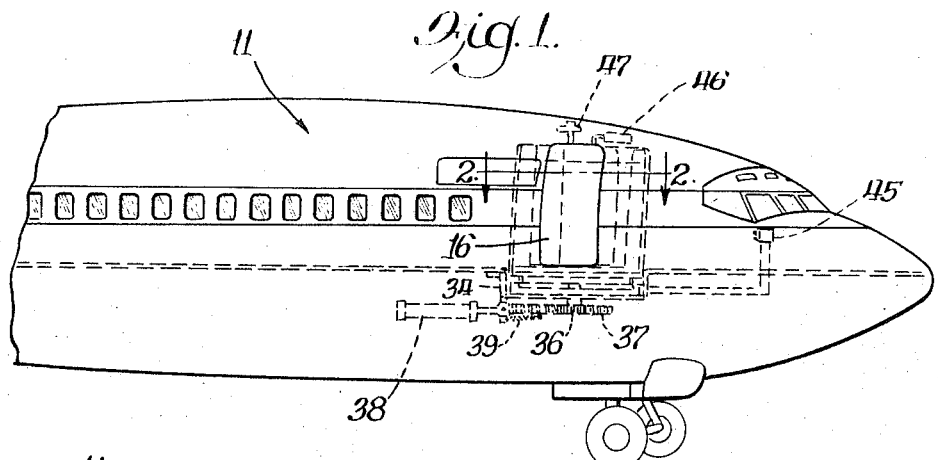
FIG. 1 is an elevational view of the forward portion of an aircraft illustrating the location of the anti-hijacking means of this invention.

Referring more particularly to FIG. 1, reference numeral 11 indicates in general an aircraft having the usual fuselage and frame and an interior wall structure carried by the frame and defining a passenger area 12 (FIG. 2), an entrance area 13 and a pilot area 14. The usual door 15 is interposed between the entrance area 13 and the pilot area 14, and normal exit openings from the interior area 13 at the sides of the aircraft are provided with standard entrance doors 16.

The anti-hijacking means of FIGS. 1-8 embodying the instant invention includes normally inoperative vertical wall means comprising stationary wall members 17 (FIG. 5), which with the previously noted wall structure within the fuselage define the entrance area 13 (FIG. 2), and movable wall members 18. As best seen in FIG. 4, the movable wall members 18 preferably are formed as segmental portions of a hollow cylinder joined at their upper ends by a marginal ring 19 and at their lower ends by similar marginal ring 21 formed integrally with or attached to circular spider means 22. The movable wall members 18 thus comprise segments of a hollow cylinder defined by the marginal end rings 19 and 21 which is coaxially disposed with an imaginary hollow cylinder similarly defined by segmental portions which comprise the stationary wall members 17.

Figure 2:
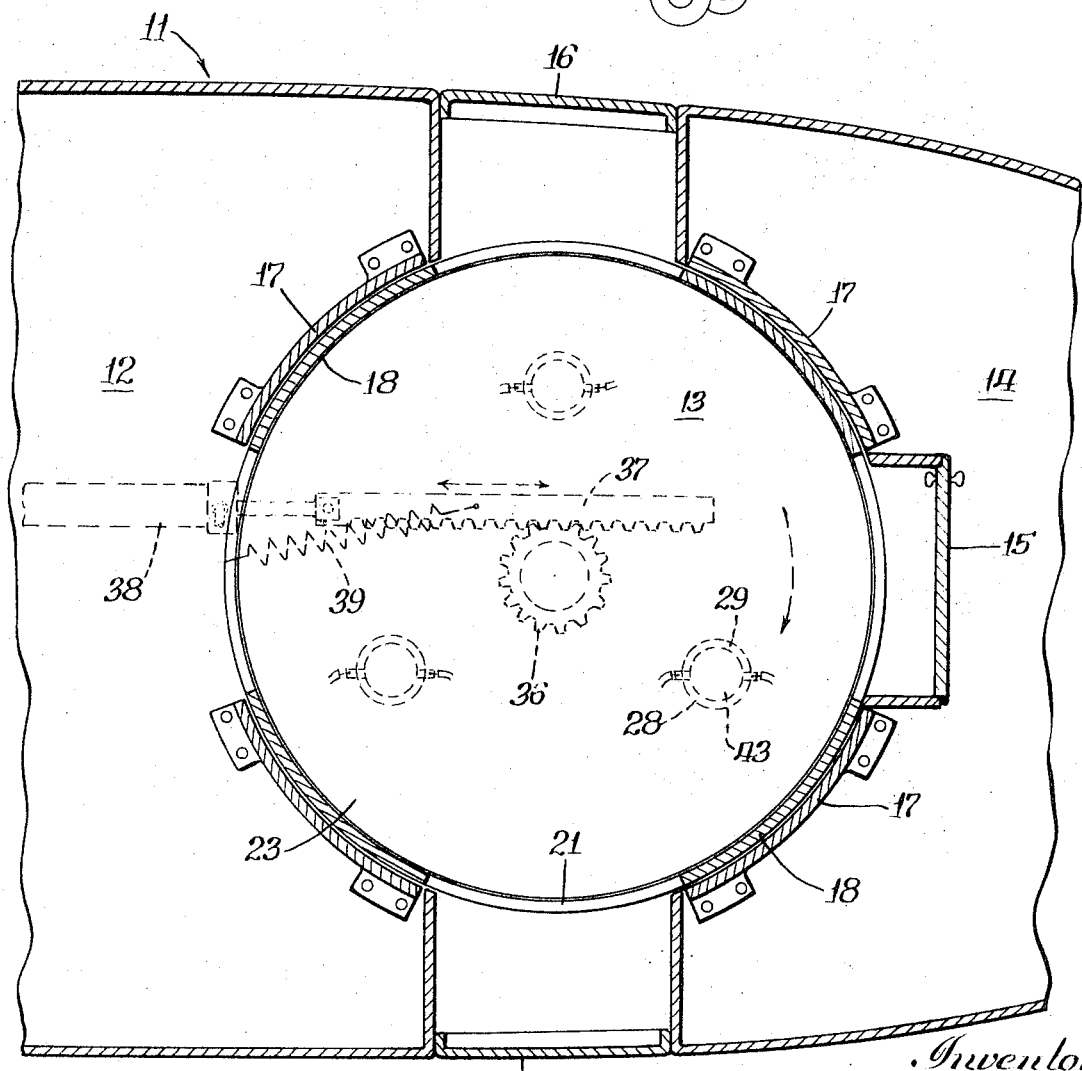
FIG. 2 is an enlarged detail horizontal section taken substantially on the line 2—2 of FIG. 1.
Figure 7:
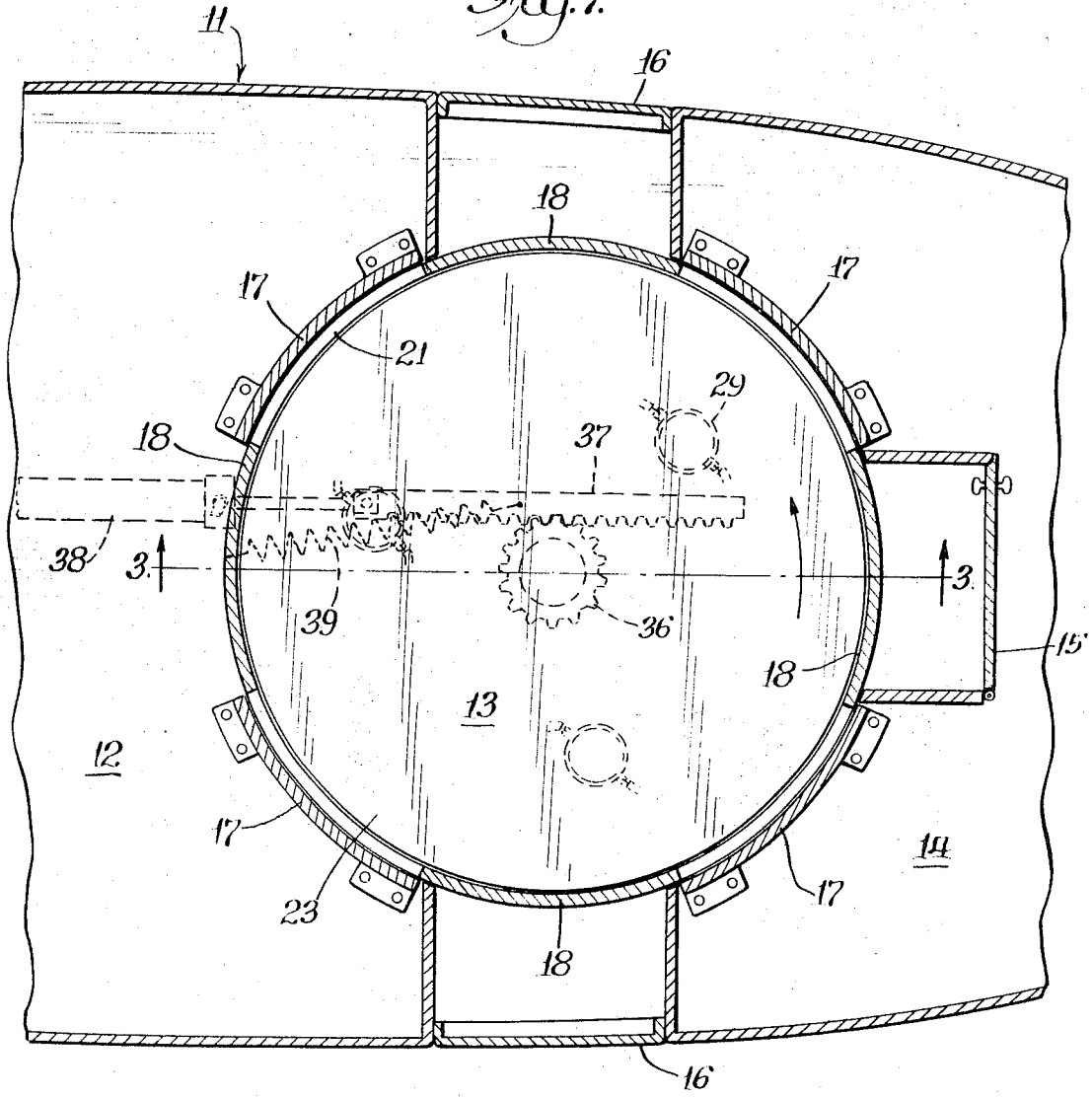
FIG. 7 is a horizontal section similar to FIG. 2 showing the movable wall members in operative position.
Figure 8:
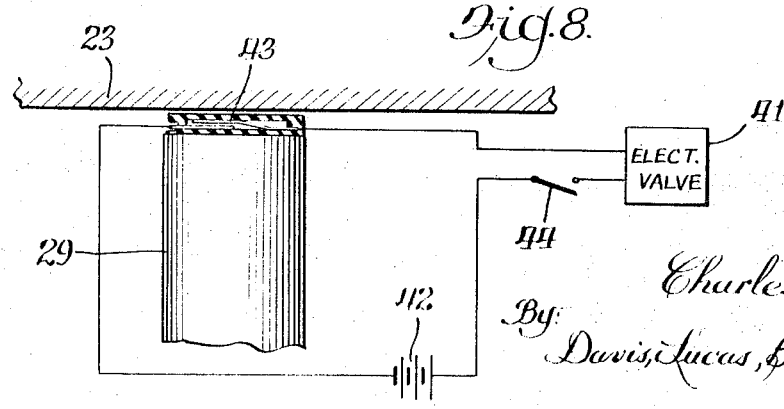
FIG. 8 is a schematic diagram illustrating an electrical circuit for one of the pressure-responsive floor switches.

When the movable wall members 18 are in their normal inoperative position of FIG. 2, doorways or spaces are defined thereby and by the stationary wall members 17 between the passenger area 12 and the entrance area 13, between the latter and the door 15 to the pilot area 14, and from the entrance area 13 to the spaces adjacent the entrance doors 16. However, when the movable wall members 18 are rotated about the axis of the hollow cylinder which they define in a manner later to be described, they will be moved to their operative position of FIG. 7 in which they block those several doorway spaces. In such operative position, the movable wall members 18 and the stationary wall members 17 comprise adjacently overlapping segments to form a completely enclosed capsule.

Floor means 23 comprising a circular plate (FIG. 6) is disposed interiorly of the movable wall members 18. The plate 23 is provided with an axle or shaft portion 24 extending downwardly from its center for vertical sliding engagement in a suitable bearing race 25 mounted in the upper counterbored portion of a centrally disposed recess 26 in the base or spider means 22 of the movable wall means (FIG. 3). A coil spring 27 is disposed within the recess 26 for resiliently maintaining floor means 23 in its normal position of FIG. 3. The underside of the floor means or plate 23 also is provided with a plurality of circumferentially spaced apertures 28 slidably cooperating with the upper ends of cylindrical posts 29. These posts 29 extend upwardly from a base member 31 through segmentally-shaped slots 32 in the spider 22.

The base member 31, as best seen in FIG. 4, includes an upwardly extending marginal flange on which roller bearings 33 are mounted in well-known manner for cooperation with the lower surface of the marginal portion of the spider 22 to support the latter and the movable wall members 18 and the floor means 23. This base member 31 is supported in any suitable manner by the frame of the fuselage of the aircraft 11, as by being welded to depending brackets 34 (FIG. 3) forming a part of the fuselage frame. The base member 31 also is provided with a central aperture through which a depending central shaft 35 on the spider means 22 freely extends.

Means are provided for moving the wall means between normal inoperative and operative positions which comprise a gear 36 mounted upon and secured to the lower end of the shaft 35 and a rack 37 engaging or meshing therewith and mounted in any suitable manner for horizontal sliding movement. One end of the rack 37 is connected in well-known manner to any suitable actuating means 38 (FIGS. 2 and 3), such as to the piston of an hydraulic cylinder or the armature of an electric solenoid. If an hydraulic cylinder is employed as the actuating means 38, it may be of the two-way variety to selectively move the rack 37 in either direction or a one-way type operable only to move the rack 37 from its normal rearward position of FIG. 2 to its forward position of FIG. 7. Likewise, if the actuating means 38 comprises a solenoid, it may be designed to move the rack 37 forwardly in similar manner and, as in the case of a one-way hydraulic cylinder, a suitable spring 39 may be interconnected between a depending bracket 34 and the rack 37 to return the latter rearwardly from its position of FIG. 7 to that of FIG. 2 when the actuating means 38 is rendered inoperative or deenergized.

Whatever specific type of actuating means 38 is employed, the same may be controlled in well-known manner by an electric valve 41 (FIG. 8) interconnectable with a suitable source of electrical energy 42 through pressure-responsive switch means 43. This switch means 43 may comprise a single switch mounted on the upper end of one of the posts 29 or a similarly disposed switch on each of the posts 29 connected in parallel with each other. Such switch means 43 is normally open and is closed in response to downward pressure exerted on the floor means or plate 23 to cause energization of the electric valve 41 to initiate operation of the actuating means 38. This results in sliding movement of the rack 37 from its position of FIG. 2 to that of FIG. 7 which, through the agency of the gear 36, shaft 35 and spider means 22, rotates the movable wall members 18 to their operative position of FIG. 7 to trap within the entrance area 13 that which applied downward pressure on the floor means 23.

It will be appreciated that during the usual loading and unloading operations it is necessary to maintain the movable wall members in their normal inoperative position and to prevent operation thereof in response to pressure on the floor means 23. To this end, a suitable control switch 44 (FIG. 8) is interposed in the circuit to the electric valve 41 which is disposed in a control unit 45 (FIG. 1) in the pilot area 14. The pilot may thus render the floor means 23 inactive by moving the control switch 44 to its open position of FIG. 8. After a loading operation has been completed, he may then render the floor means 23 active by closing that control switch 44. Thereafter, any time that any downward pressure is exerted on the floor means 23, the movable wall members 18 will automatically be moved to their operative position of FIG. 7 to entrap within the entrance area 13 that which applied the downward pressure to the floor means and to effectively prevent any person so trapped from reaching the pilot area 14, returning to the passenger area 12 or having access to the entrance doors 16.

The movable wall members 18 may be returned to their normal inoperative positions of FIG. 2 thereafter only in response to manipulation of the control unit 45 in the pilot area 14. This may be effected by reversely actuating the two-way hydraulic cylinder, if such is used as the actuating means 38, or by moving the control switch 44 to open position if the actuating means comprises a one-way hydraulic cylinder or electric solenoid. In the latter case, such will permit the spring 39 to return the rack 37 to its normal position of FIG. 2 to move the wall members 18 to provide free access from entrance area 13 to the passenger area 12 and the outside entrance doors 16. Access to the pilot area 14, of course, will continue to be controlled by the door 15.

It is appreciated that in order to render this anti-hijacking means foolproof, it may be necessary to have the usual telephonic communication devices for talking to those in the pilot area 14 located only in the entrance area 13. This simple expedient would avid the possibility of a hijacker communicating with the pilot area from some other part of the aircraft. If thus required to enter the entrance area in order to attempt to communicate with the pilot area, the hijacker would be trapped by the instant device in the manner previously described.

If the hijacking attempt involves one or more hostages, it will be apparent that the hostage or hostages also may be trapped in the entrance area 13 with the hijacker. In order to avoid any physical harm to a hostage, it is contemplated that the enclosed entrance area may be filled with a temporarily effective disabling gas under control from the pilot area 14. If, thereafter, it is desired to remove the hostage or hijacker thus disabled, the disabling gas first may be evacuated from the enclosed entrance area, after it has rendered the occupants thereof unconscious, and the wall means 18 returned to normal inoperative position in response to operation of the control means in the pilot area.

To this end, a cannister 46 (FIG. 1) containing suitable disabling gas under pressure may be mounted in the fuselage above, and with an outlet extending downwardly through, that portion of the fuselage forming a ceiling for the entrance area 13 which is under the control, in well-known manner, of a switch forming part of the control unit 45 in the pilot area 14.

Also mounted adjacent the cannister 46 is an exhaust fan 47, also controllable by a switch forming a part of the control unit 45, and having an inlet communicating with the entrance area 13 and an outlet discharging exteriorly of the fuselage.

Figure 9:
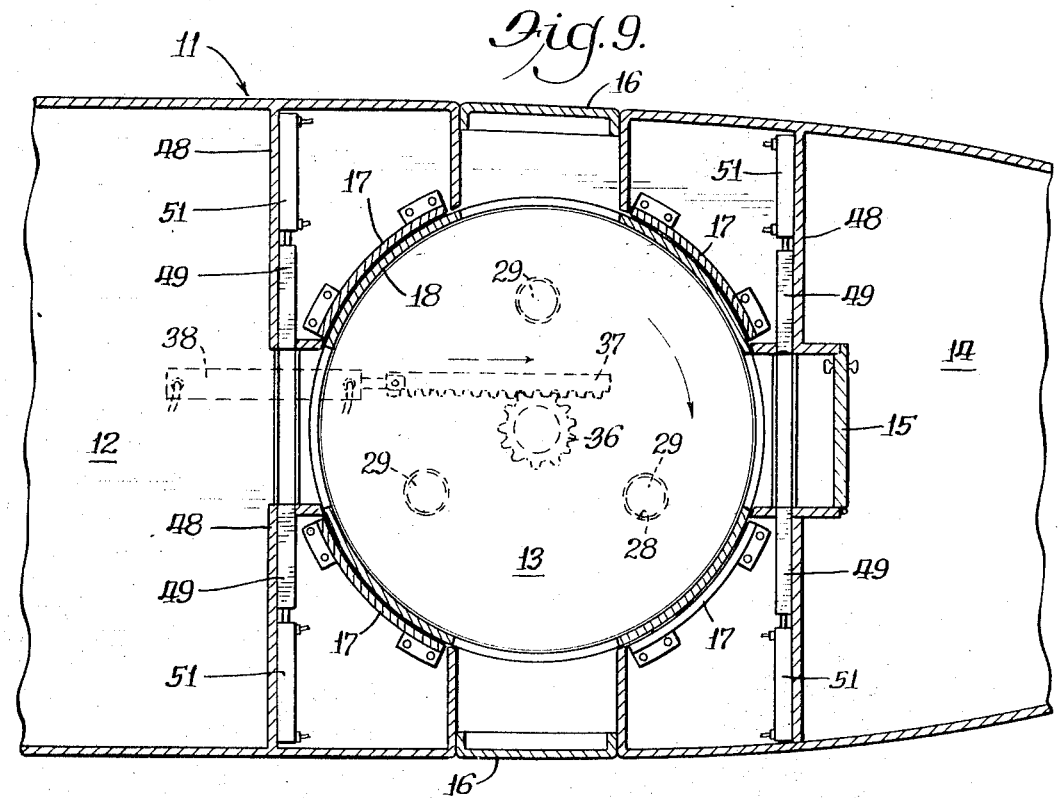
FIG. 9 is a horizontal section similar to FIG. 2 showing a modified structure with the movable wall members in normal inoperative position.
Figure 10:
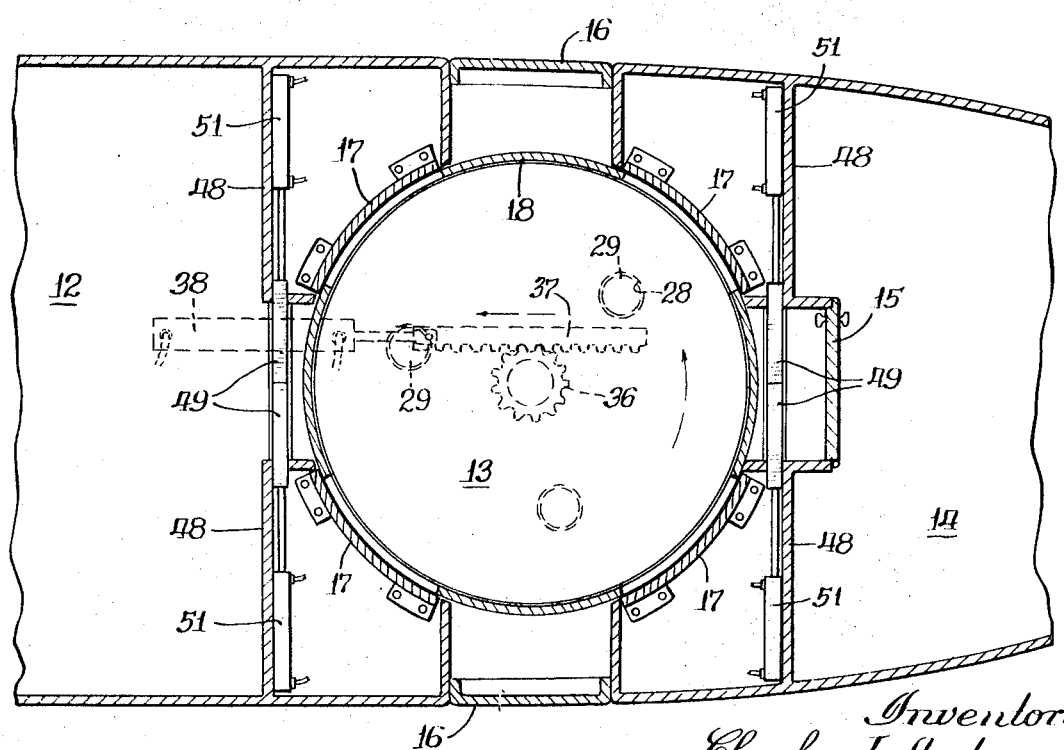
FIG. 10 is a view similar to FIG. 9 with the movable wall members shown in operative or closed positions.

A modification of the anti-hijacking means hereinbefore described is illustrated in FIGS. 9 and 10. This may include the same stationary wall members 17 and movable wall members 18 and the operative mechanism previously described. In addition, or in lieu thereof, it comprises stationary wall members 48 dividing the entrance area 13 from the pilot area 14 and the passenger area 12 and normally inoperative, movable wall members 49. The stationary wall members 48 are mounted as two pairs of laterally aligned walls each defining a doorway. The movable wall members 49 are disposed inwardly, respectively, of those stationary wall members 48 and are mounted in any suitable manner for lateral sliding movements relative thereto. Thus, when the movable wall members 49 are outwardly disposed as in FIG. 9, they are in an inactive or inoperative position, and when they are slid inwardly therefrom to their operative positions of FIG. 10, the associated movable wall members 49 engage abuttingly or in edge-overlapping relationship to effectively block the doorways defined by the stationary wall members 48.

Each movable wall member 49 is provided with an actuating member 51 which, as in the case of the actuating means 38, may comprise either a two-way or a one-way hydraulic cylinder or an electrically operable solenoid. It will be understood that these actuating members 51 will be controlled automatically in response to downward pressure on the floor of the entrance area 13 in the same manner as previously described with respect to the actuating means 38. And if both the wall means 17, 18 and 48, 49 are employed as illustrated in FIGS. 9 and 10, it will be readily apparent that the control unit 45 in the pilot area 14 may include controls for selectively actuating either such set of wall means. Thus, if a hijacker has been entrapped within the entrance area, the inner wall members 18 may be returned to inoperative position after the aircraft has been landed and suitable police forces are available exteriorly thereof to effect apprehension without giving free access to the passenger area 12 from the entrance area 13. It will be understood, of course, that the several wall members 17, 18, 48 and 49, the floor means 23 and the ceiling for the entrance area 13 are constructed from suitable bullet-proof, lightweight, fire-proof material or materials.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the forms hereinbefore described and shown in the drawings being merely preferred embodiments thereof.

What is claimed is:

1. In an aircraft having a fuselage including a frame and a wall structure carried by said frame defining passenger and pilot areas with entrances therebetween and from the exterior into said passenger area; anti-hijacking means carried by said frame between said passenger and pilot areas, comprising normally inoperative vertical wall means, floor means disposed interiorly of said wall means, and actuating means automatically operable in response to downward pressure on said floor means to move said wall means to operative position to block access from said passenger area to said pilot area.

2. An aircraft according to claim 1, wherein said wall means includes stationary wall members defining an entrance area between said passenger and pilot areas and said entrances thereto, and normally inoperative movable wall members moved by said actuating means to operative position to block the latter said entrances to cooperate with said stationary wall members to trap within said entrance area that which applied downward pressure on said floor means.

3. An aircraft according to claim 2, wherein said wall means includes laterally disposed wall members movable by said actuating means to block said entrances from the exterior of the aircraft.

4. In an aircraft according to claim 1, control means operable from said pilot area for rendering said actuating means operative or inoperative.

5. An aircraft according to claim 4, wherein said control means is selectively operable to effect return of said wall means to normally inoperative position.

6. Anti-hijacking means in an aircraft according to claim 2, wherein said stationary and movable wall members, respectively, comprise segments of coaxial hollow cylinders, with adjacent said segments overlapping when said movable members are in operative position to form a completely enclosed capsule.

7. Anti-hijacking means according to claim 6, wherein said movable wall members are connected to spider means having a central shaft with a gear thereon, and said actuating means comprises a power-actuated rack meshing with said gear.

8. Anti-hijacking means according to claim 7, wherein said spider means is at the lower end of said movable wall members, and roller bearing means supported by said frame for supporting said spider means.

9. Anti-hijacking means according to claim 8, wherein said floor means is spring-supported on said spider means.

10. Anti-hijacking means according to claim 9, wherein said actuating means comprises normally open pressure-responsive switch means interposed between said spider and said floor means automatically closed in response to downward pressure on the latter.

11. In an aircraft according to claim 2, a supply of disabling gas under pressure mounted in said fuselage with a discharge extending into said entrance area, and control means in said pilot area for causing discharge of gas from said supply into said entrance area.

12. In an aircraft according to claim 11, means mounted in said fuselage with control means in said pilot area for evacuating gas from said entrance area and discharging the same exteriorly of said fuselage.

* * * * *